(12) United States Patent
Kitakami

(10) Patent No.: US 11,347,059 B2
(45) Date of Patent: May 31, 2022

(54) HEAD MOUNTED APPARATUS

(71) Applicant: CANON KABUSHIKI KAISHA, Tokyo (JP)

(72) Inventor: Marina Kitakami, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/591,487

(22) Filed: Oct. 2, 2019

(65) Prior Publication Data
US 2020/0117008 A1    Apr. 16, 2020

(30) Foreign Application Priority Data

Oct. 11, 2018  (JP) .............................. JP2018-192552

(51) Int. Cl.
*G02B 27/01*     (2006.01)
*G06T 19/00*     (2011.01)
*G06F 3/01*      (2006.01)

(52) U.S. Cl.
CPC ..... *G02B 27/0172* (2013.01); *G02B 27/0176* (2013.01); *G06F 3/011* (2013.01); *G06T 19/006* (2013.01)

(58) Field of Classification Search
CPC ....................................................... G06F 3/011
See application file for complete search history.

(56) References Cited

U.S. PATENT DOCUMENTS

| | | | |
|---|---|---|---|
| 10,055,887 B1 * | 8/2018 | Gil ........................... | G06F 1/163 |
| 2002/0008677 A1 * | 1/2002 | Saito .................. | G02B 27/0176 345/8 |
| 2002/0118506 A1 * | 8/2002 | Saito ....................... | G06F 1/163 361/679.03 |
| 2010/0327028 A1 * | 12/2010 | Nakabayashi ......... | A42B 1/247 224/181 |
| 2014/0176398 A1 * | 6/2014 | West ................... | G02B 27/0176 345/8 |
| 2016/0370590 A1 * | 12/2016 | Fujishiro ............ | G02B 27/0176 |
| 2017/0003508 A1 * | 1/2017 | Toriihara ........... | G02B 27/0176 |
| 2017/0322410 A1 * | 11/2017 | Watson ................ | G02B 21/365 |
| 2019/0212772 A1 * | 7/2019 | Chen ...................... | G02B 7/002 |
| 2020/0050235 A1 * | 2/2020 | Yoon ...................... | G02B 27/01 |

FOREIGN PATENT DOCUMENTS

JP            7-168119 A        7/1995

* cited by examiner

*Primary Examiner* — Md Saiful A Siddiqui
(74) *Attorney, Agent, or Firm* — Canon U.S.A., Inc. I.P. Division

(57) ABSTRACT

The present disclosure is directed to a head mounted apparatus that provides similar feeling in wearing, regardless of differences in head shape of users, and maintains stability of wearing even in a case where a user moves the head. A head mounted apparatus to be mounted on a head of a user includes a display unit configured to display an image to the user, an abutment portion disposed near the display unit and configured to abut the head of the user, a support member connected to the abutment portion and configured to hold a positional relationship between the abutment portion and the head of the user, and an assistance member movably connected to the abutment portion, and configured to abut a side portion of a face of the user and to assist support of the support member.

13 Claims, 10 Drawing Sheets

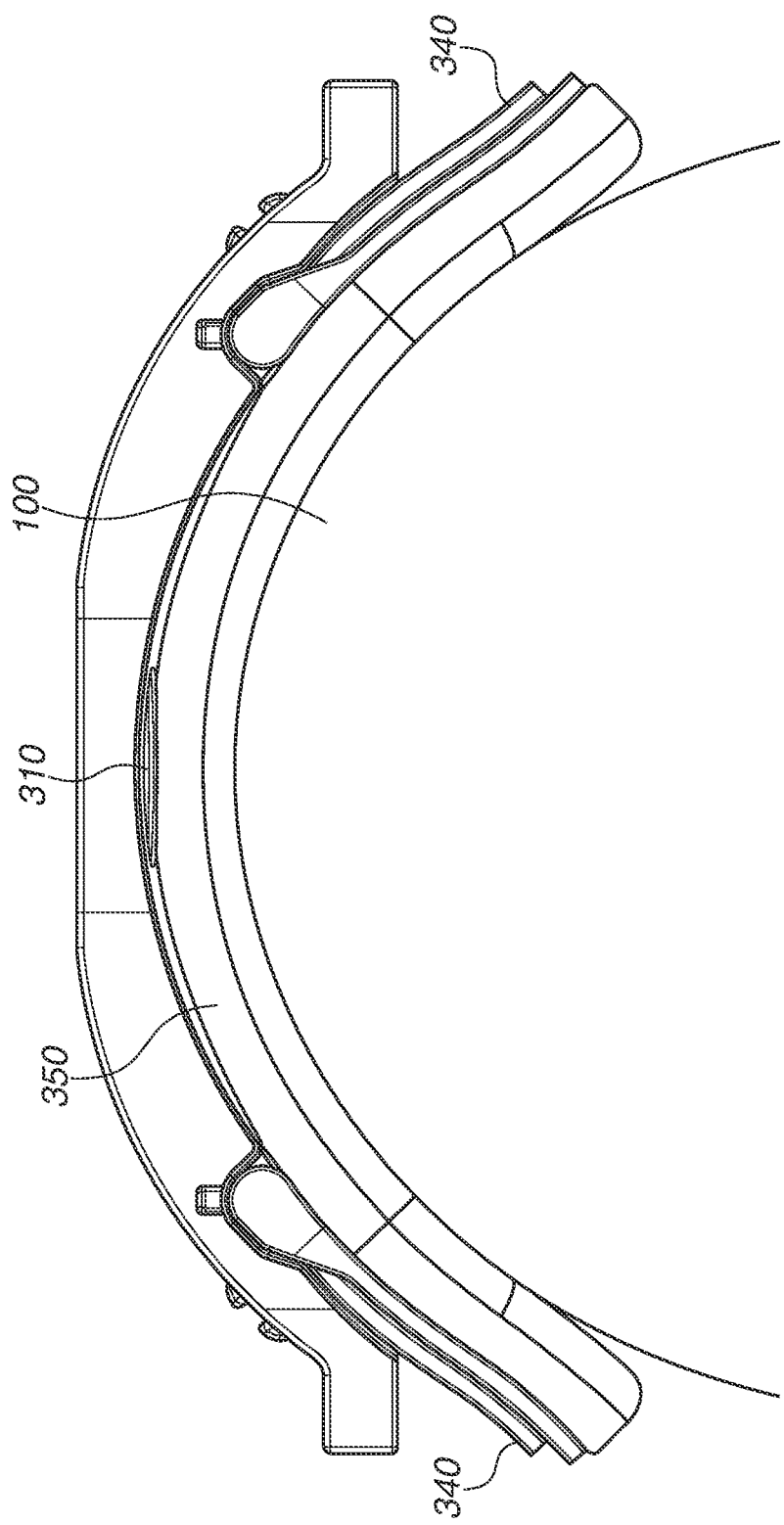

HEAD MOUNTED APPARATUS

BACKGROUND OF THE INVENTION

Field of the Invention

The present disclosure relates to a head mounted apparatus that displays an image to a user.

Description of the Related Art

Conventionally, there is a head mounted apparatus that includes a display unit for displaying an image and is mounted on the head of a user when used. Such a head mounted apparatus is called a head mounted display (HMD) and can present images including an image of a virtual space to a user. In recent years, the HMD has been used in various fields.

As a mounting mechanism of the HMD, there is a mechanism called a goggle type, and this mechanism tightens a head with a belt-shaped member. There is also a mechanism that provides a front head pad and a back head pad, and presses and loosens a head by moving the back head pad back and forth. In any case, the mounting mechanism of the HMD is expected to keep a position for holding the display unit even if the user moves the head, and provide comfortable feeling in wearing, besides holding the display unit at a position and orientation to properly observe an image.

In Japanese Patent Application Laid-Open No. 7-168119, an HMD has a support portion for supporting the HMD on the head of a wearer and the HMD is made of a lightweight material or flexible material. Further, for an HMD having an image display unit that can slip down by the weight of the image display unit, the area of a portion contacting the back portion of the head of a wearer is made broader or configured of branched strips. In such a configuration in the above document, the image display unit slips down less easily. However, the configuration is not sufficient for a case where the user tilts the head from the front either rightward or leftward while wearing the HMD.

The conventional goggle-type mounting mechanism has a flexible member for dispersing/relieving pressure at a portion that abuts the face of a wearer, and a rigid member is used as a base for fixing the flexible member. Therefore, in a case where the HMD employs the rigid member having a shape suitable for a person having a large head, if a person having a small head wears the HMD, the user is in a state where the HMD is supported by the front portion of the head and thus a space is formed on a side portion of the face. If the wearer tilts the head either rightward or leftward, there is a possibility that the image display unit shifts in a lateral direction relative to the head of the wearer by the weight of the image display unit.

In contrast, in a case where the HMD employs the rigid member having a shape suitable for a person having a small head, if a person having a large head wears the HMD, the area of a portion where the flexible member abuts the face of the wearer decreases, and a pressure applied to the head of the wearer increases, so that wearing comfort may decline. Moreover, the user may attempt to use the HMD and a pair of glasses together, but there is a case where the HMD and the pair of glasses cannot be used together because the rigid member interferes with the pair of glasses.

SUMMARY OF THE INVENTION

The present disclosure is directed to a head mounted apparatus that provides similarly comfortable feeling in wearing, regardless of differences in head shape among users, and maintains stability of wearing even in a case where a user moves the head.

According to an aspect of the present disclosure, a head mounted apparatus to be mounted on a head of a user includes a display unit configured to display an image to the user, an abutment portion disposed near the display unit and configured to abut the head of the user, a support member connected to the abutment portion and configured to hold a positional relationship between the abutment portion and the head of the user, and an assistance member movably connected to the abutment portion, and configured to abut a side portion of a face of the user and to assist support of the support member.

Further features of the present disclosure will become apparent from the following description of exemplary embodiments with reference to the attached drawings.

BRIEF DESCRIPTION OF THE DRAWINGS

FIG. 4 is a diagram illustrating arrangement of a flexible member according to the first exemplary embodiment.

DESCRIPTION OF THE EMBODIMENTS

Figure 1:
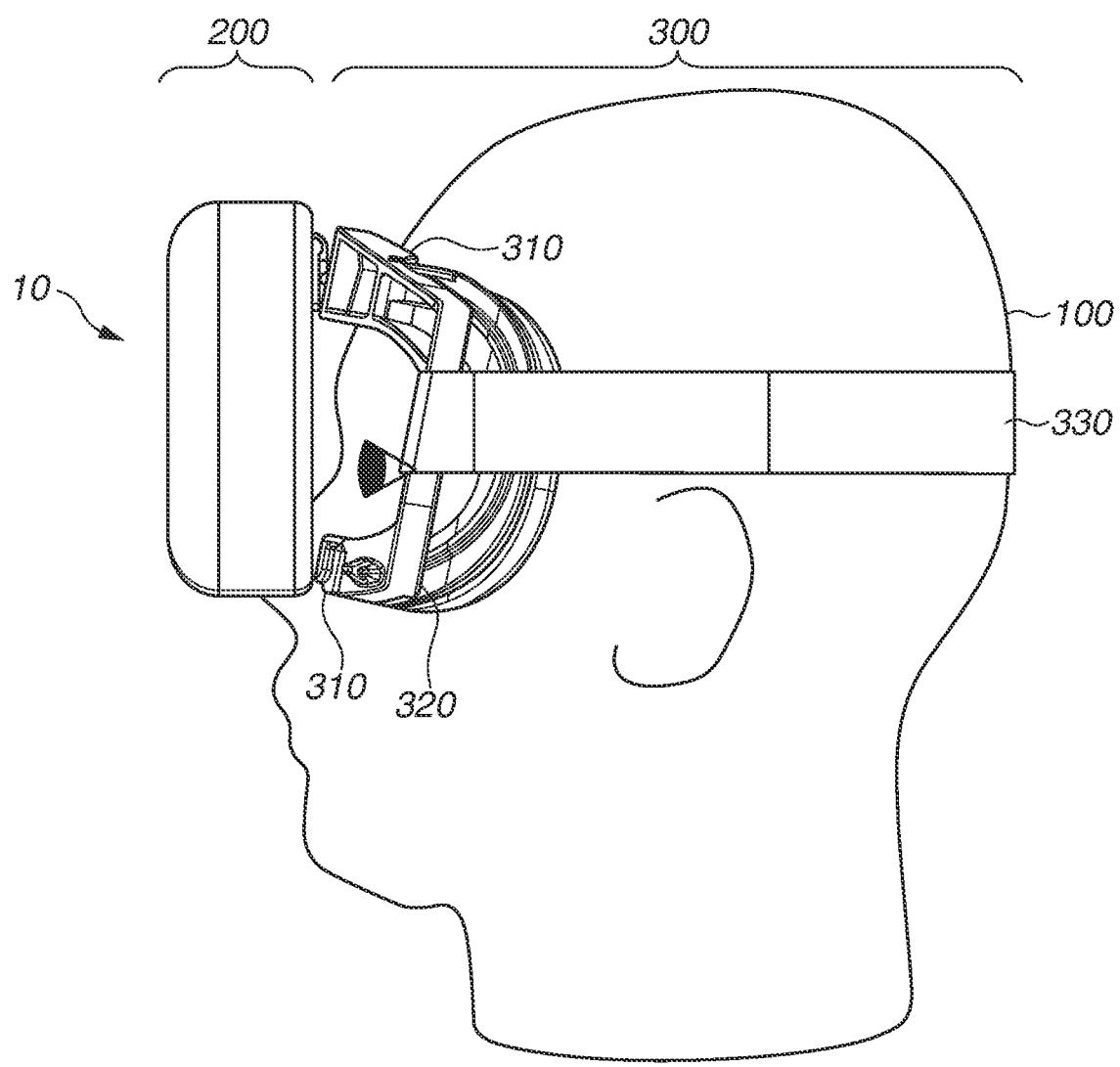
FIG. 1 is a diagram illustrating a state of wearing a head mounted apparatus according to a first exemplary embodiment

FIG. 1 is a diagram illustrating a state where a user is wearing a head mounted apparatus 10 according to a first exemplary embodiment. The head mounted apparatus 10 includes an image display unit 200, and a mount unit 300 having a function of mounting the image display unit 200 on a user head 100. The image display unit 200 and the mount unit 300 may be separate members. The image display unit 200 contains an element (not illustrated) for displaying an image in the inside, and an optical system (not illustrated) for enlarging the image displayed by the display element and guiding the enlarged image to the eyes of the user. The display element and the optical system are disposed in front of the eyes of the user and held by the mount unit 300. The image display unit 200 may further contain in the inside an imaging unit that includes an imaging element and an imaging optical system, and be configured such that a real image captured by the imaging unit is enlarged by the display unit and the enlarged image is guided to the eyes of the user. The image display unit 200 may superimpose computer graphics (CG) data on a captured real space image and display an image obtained thereby on the display element.

The image display unit 200 is held on the user head 100, by connecting the image display unit 200 to an abutment portion 310 provided in the mount unit 300 to abut the user head 100, and a fixing-side member 320 including the abutment portion 310. A support member 330 holds the positional relationship between the abutment portion 310 and the user head 100 to utilize a pressing force against the user head 100. As illustrated in FIG. 1, the abutment portion 310 is disposed near the image display unit 200. The support member 330 is not limited to a specific configuration as long as the support member 330 has a function of holding the positional relationship between the abutment portion 310 and the user head 100. The support member 330 may have, for example, a configuration for tightening a user head with a circular flexible elastic member such as an elastic band, or a configuration for nipping the abutment portion 310 and the back portion of a user head with a rigid member.

Figure 2A:
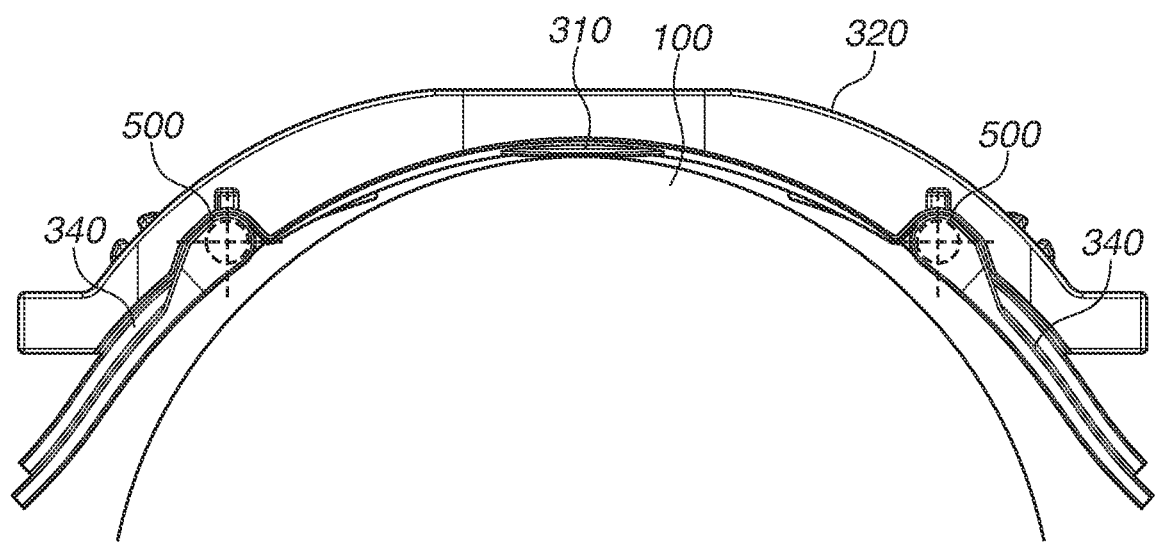
FIGS. 2A and 2B are diagrams each illustrating a top view of a configuration according to the first exemplary embodiment.
Figure 2B:
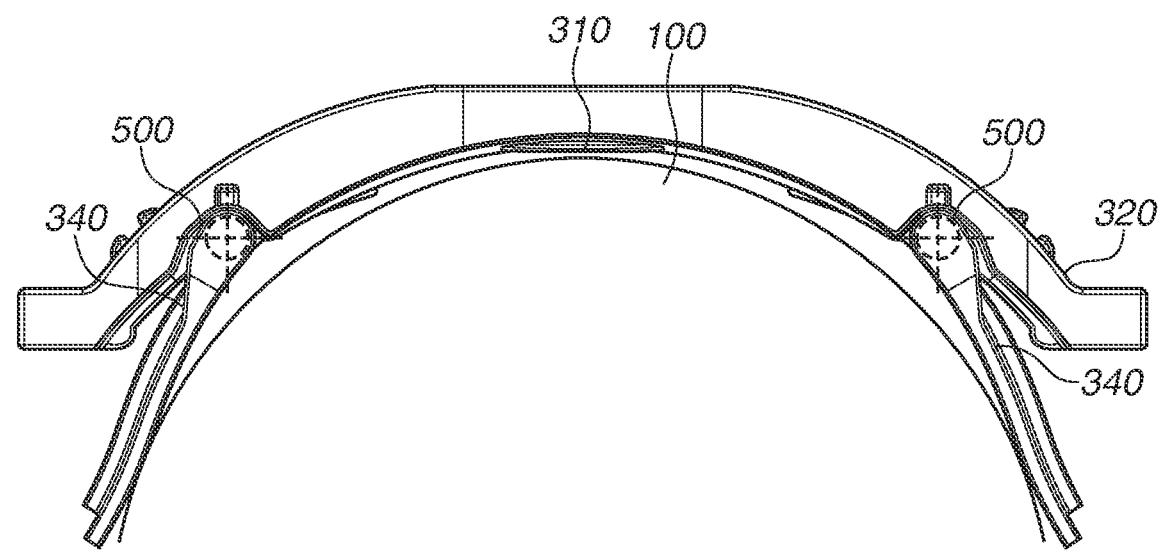
Figure 3A:
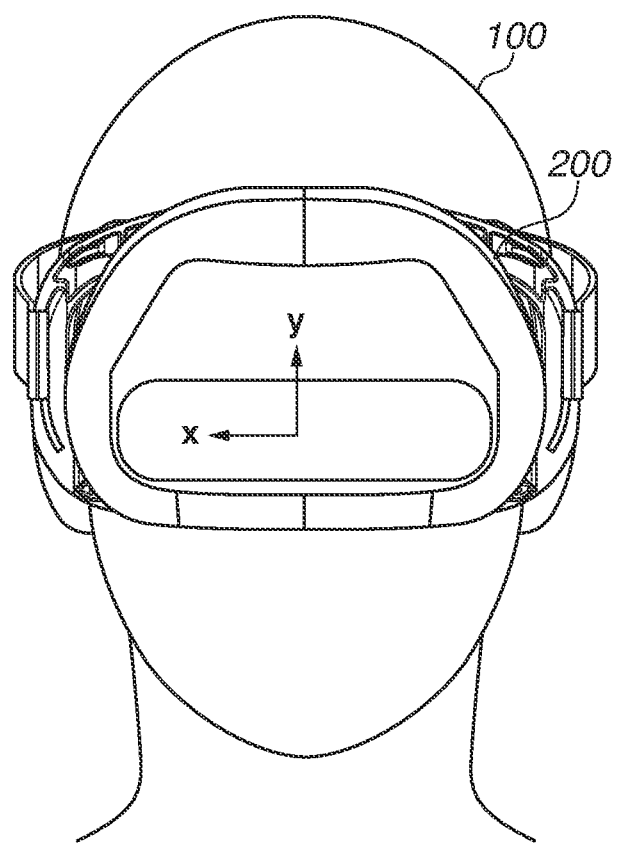
FIGS. 3A and 3B are diagrams illustrating a motion of a user of the head mounted apparatus.
Figure 3B:
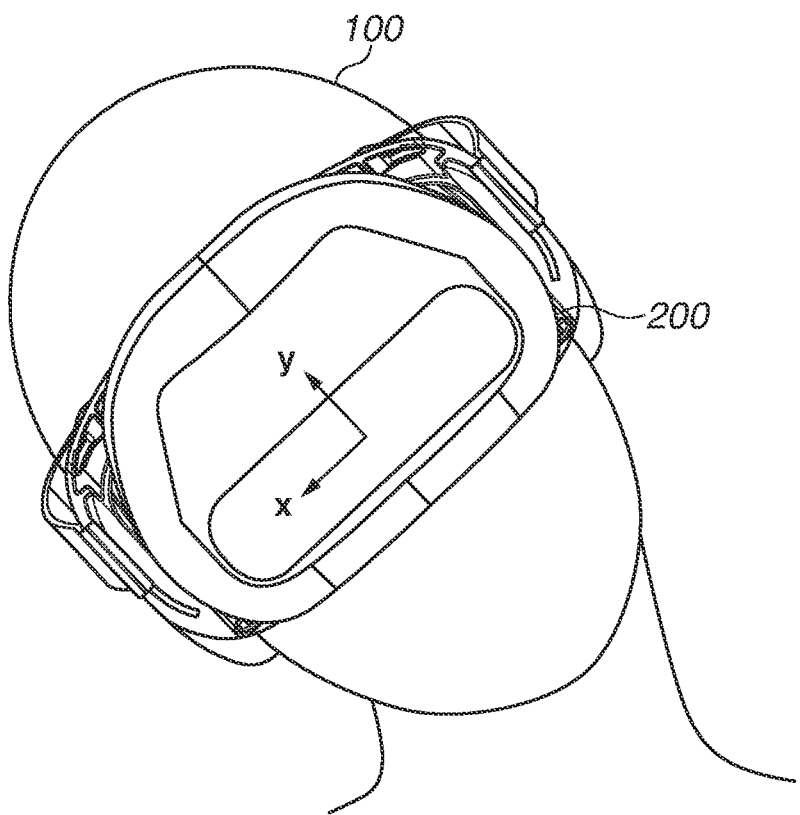

FIGS. 2A and 2B illustrate the mount unit 300 in FIG. 1, as viewed from the top of the head. FIGS. 2A and 2B illustrate the relationship between the abutment portion 310 and an assistance member 340. The assistance member 340 is connected to the abutment portion 310 via a torque hinge 500 serving as a holding member so that the assistance member 340 can rotate around a shaft of the torque hinge 500 as illustrated in FIGS. 2A and 2B. In the above-described configuration, the assistance member 340 can move along a side-portion shape of the user's face, and can provide similar wearing feeling to users having the varying side-portion shapes of the face, without preparing a mount unit matching with the side-portion shape of each of a plurality of persons. Further, the torque hinge 500 serving as the holding member is provided, so that the assistance member 340 is adjusted to a position matching with the side-portion shape, and held at the adjusted position. In such a configuration, the amount of a shift of the image display unit 200 in an X direction can be reduced, when the user moves the head either rightward or leftward as illustrated in FIG. 3B, from a state where the abutment portion 310 abuts the side-portion of the user's face and the head of the user faces frontward as illustrated in FIG. 3A. Such a configuration also enables a user to use a pair of glasses along with the head mounted apparatus 10. In the configuration, after the assistance member 340 is opened at maximum at its position, the abutment portion 310 is brought into contact with the user head 100. Then, after the frame of the pair of glasses passes through the assistance member 340, the assistance member 340 is held along the side-portion shape of the face, so that the head mounted apparatus 10 can be used together with the pair of glasses. Since the torque hinge 500 is used as the holding member, it is possible to hold the assistance member 340 at any position in a continuous way without providing a stopper mechanism. Besides, an operation can be intuitively performed. If it is possible to hold a position and orientation of the assistance member, a configuration may be used which holds a position and orientation of the assistance member 340 by using a ratchet mechanism or a stopper mechanism instead of using the torque hinge 500.

Further, the assistance member 340 may be urged in a direction of pressing the side-portion of the user's face against the abutment portion 310 with an urging member. In such a configuration, the assistance member 340 can stick to the side-portion of the user constantly without being subjected to an adjustment. The urging member is not limited to a specific configuration. For example, a torsion spring or a compression spring may be used.

Desirably, the torque of the above-described torque hinge 500 or the spring force of the spring is strong enough to prevent the assistance member 340 from moving even when the total weight of the image display unit 200 shifts at a maximum in the X direction in FIGS. 3A and 3B.

Figure 5A:
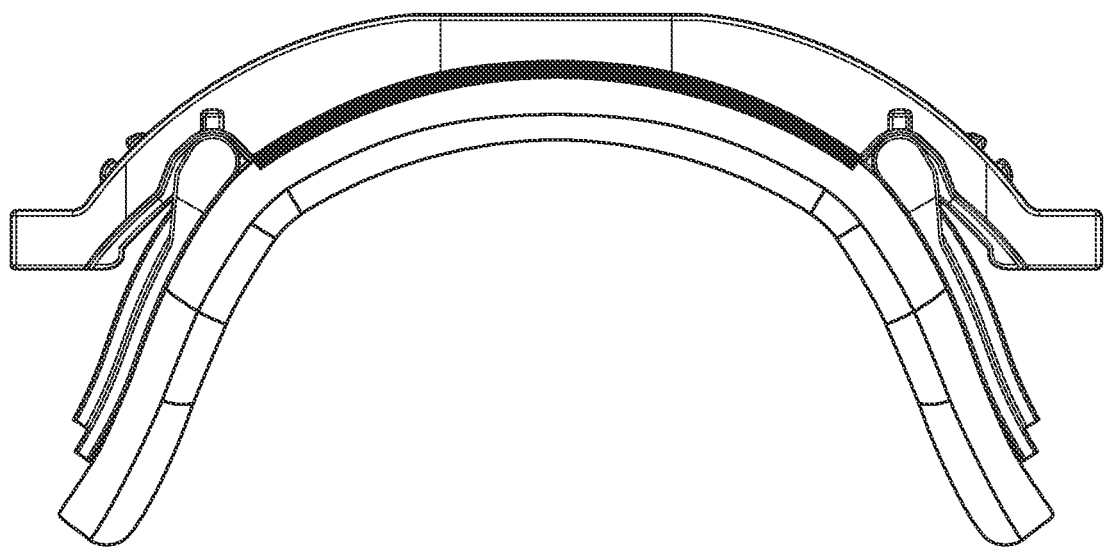
FIGS. 5A and 5B are diagrams illustrating a fixing position of the flexible member according to the first exemplary embodiment.
Figure 5B:
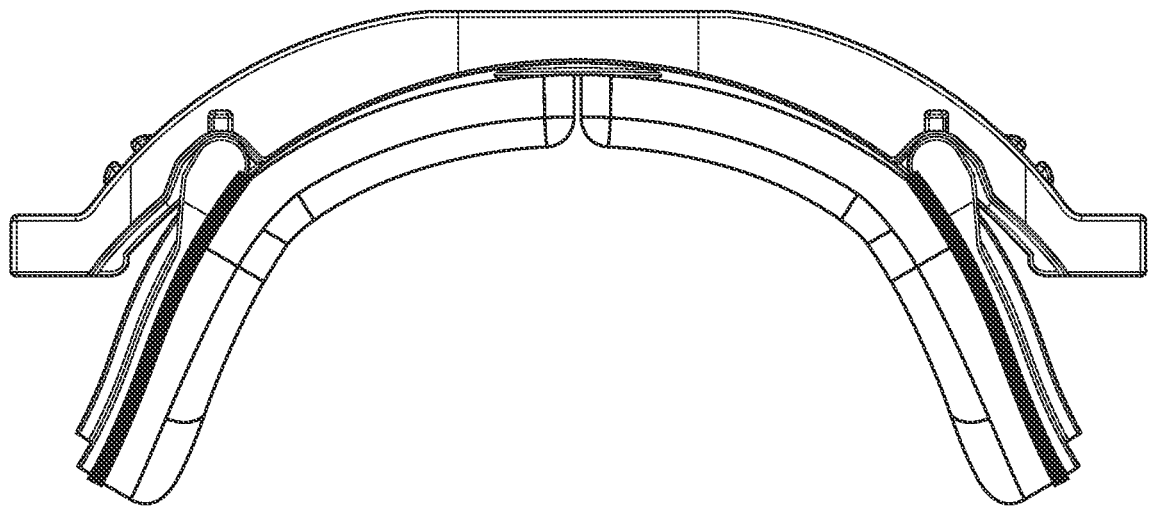

As illustrated in FIG. 4, a flexible member 350 is located between the abutment portion 310 and the assistance member 340, and the user head 100. Therefore, the area of a portion where the abutment portion 310 and the assistance member 340 are in contact with the user head 100 is increased, so that the pressure can be eased. In a case where the flexible member 350 is fixed extending from the abutment portion 310 to the assistance member 340, the flexible member 350 bends if the assistance member 340 is movable along the face side-portion shape of the user. Such bending can be suppressed by limiting the fixing position of the flexible member 350 only to the abutment portion 310 (FIG. 5A) or only to the assistance member 340 (FIG. 5B). The method of fixing the flexible member is not limited to a specific configuration. For example, attachment/detachment for replacing can be performed by using a loop fastener.

Figure 6A:
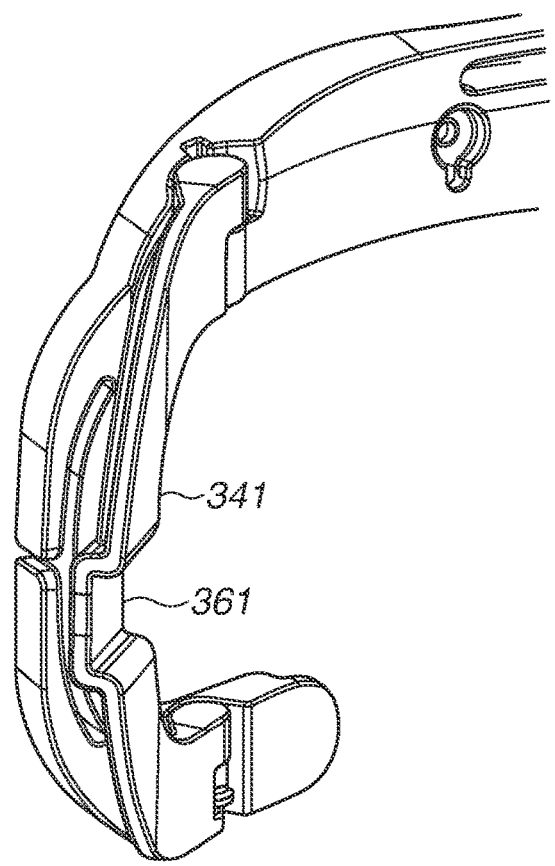
FIGS. 6A and 6B are diagrams each illustrating a shape for avoiding a temple of a pair of glasses according to the first exemplary.
Figure 6B:
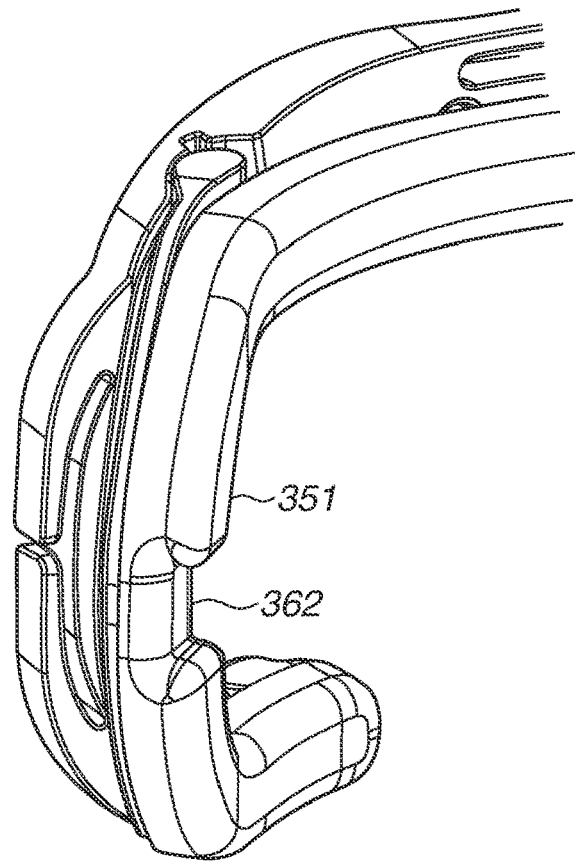

Further, as one form of the present exemplary embodiment, an assistance member 341 has a shape 361 for avoiding a temple portion of a pair of glasses as illustrated in FIG. 6A so as not to contact the temple portion of the pair of glasses. When a user wearing the pair of glasses brings the assistance member 341 to abut the face side-portion, the temple of the pair of glasses can be prevented from being caught therebetween which causes insufficient contact. Furthermore, a possibility that the user may feel uncomfortable when the temple of the pair of glasses is caught in such a way can be reduced. A flexible member 351 to be located between the abutment portion 310 and the assistance member 340, and the user head 100 can similarly have a shape for avoiding the temple portion, as illustrated in FIG. 6B. In a case where the flexible member 351 has a temple avoiding shape 362, if a user for whom the temple avoiding shape 362 is unnecessary wears the head mounted apparatus 10, shape change can be performed only by replacing the flexible member 351 with a flexible member having no temple avoiding shape.

Figure 7:
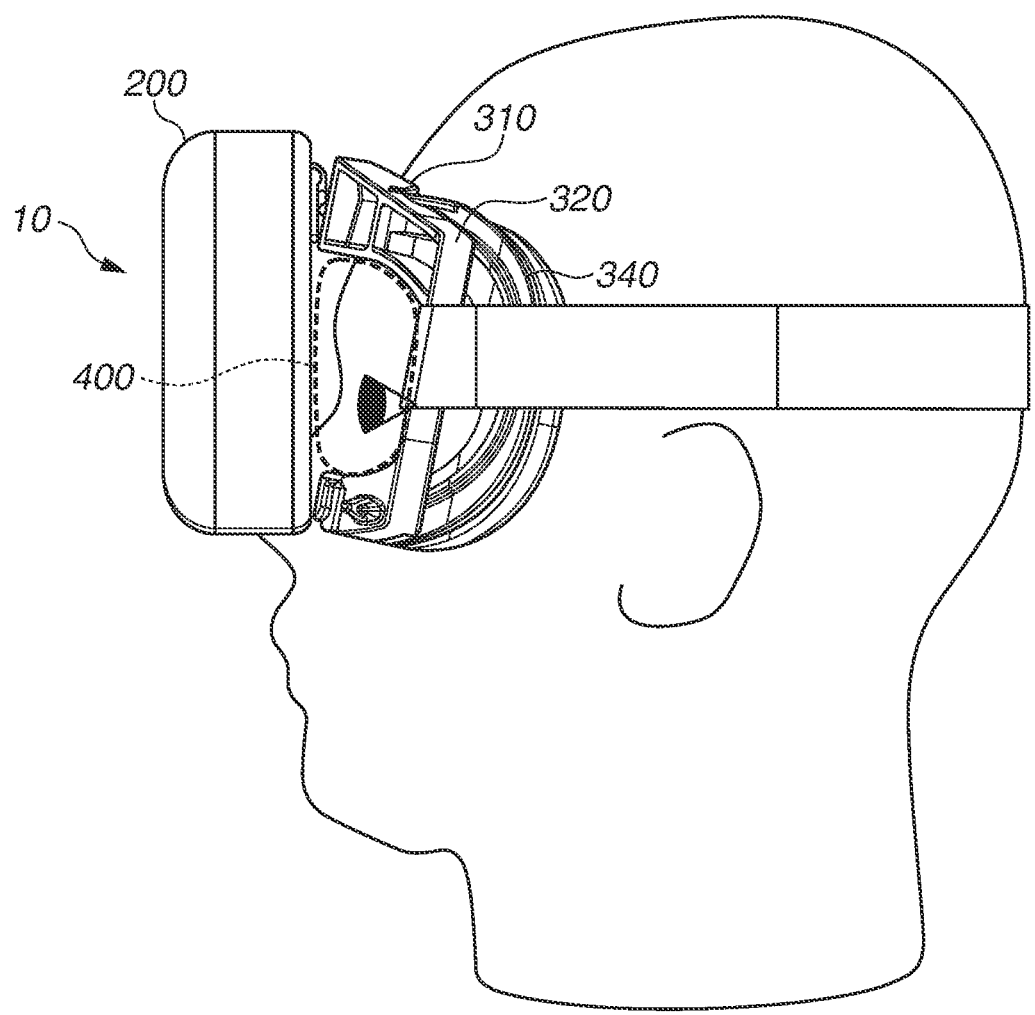
FIG. 7 is a diagram illustrating an opening portion according to the first exemplary embodiment.

As illustrated in FIG. 7, an opening portion 400 is formed in the fixing-side member 320 provided between the image display unit 200 and the assistance member 340. Therefore, the user can visually recognize a real space around the image display unit 200, in a state where the user is wearing the head mounted apparatus 10. This configuration is particularly effective in a case where a real image obtained by the imaging unit is also displayed by the display unit. Since the user can visually recognize the real space around the image display unit 200 in the state where the user is wearing the head mounted apparatus 10, an improvement in the user's safety as well as an improvement in reality of a real image displayed by the display unit can be expected. The shape of the opening portion 400 is not limited to a specific shape, so long as the shape enables the periphery of the display unit to be visually recognized from the positions of the eyes of the user. For example, a shape having a plurality of holes can be adopted.

Figure 8:
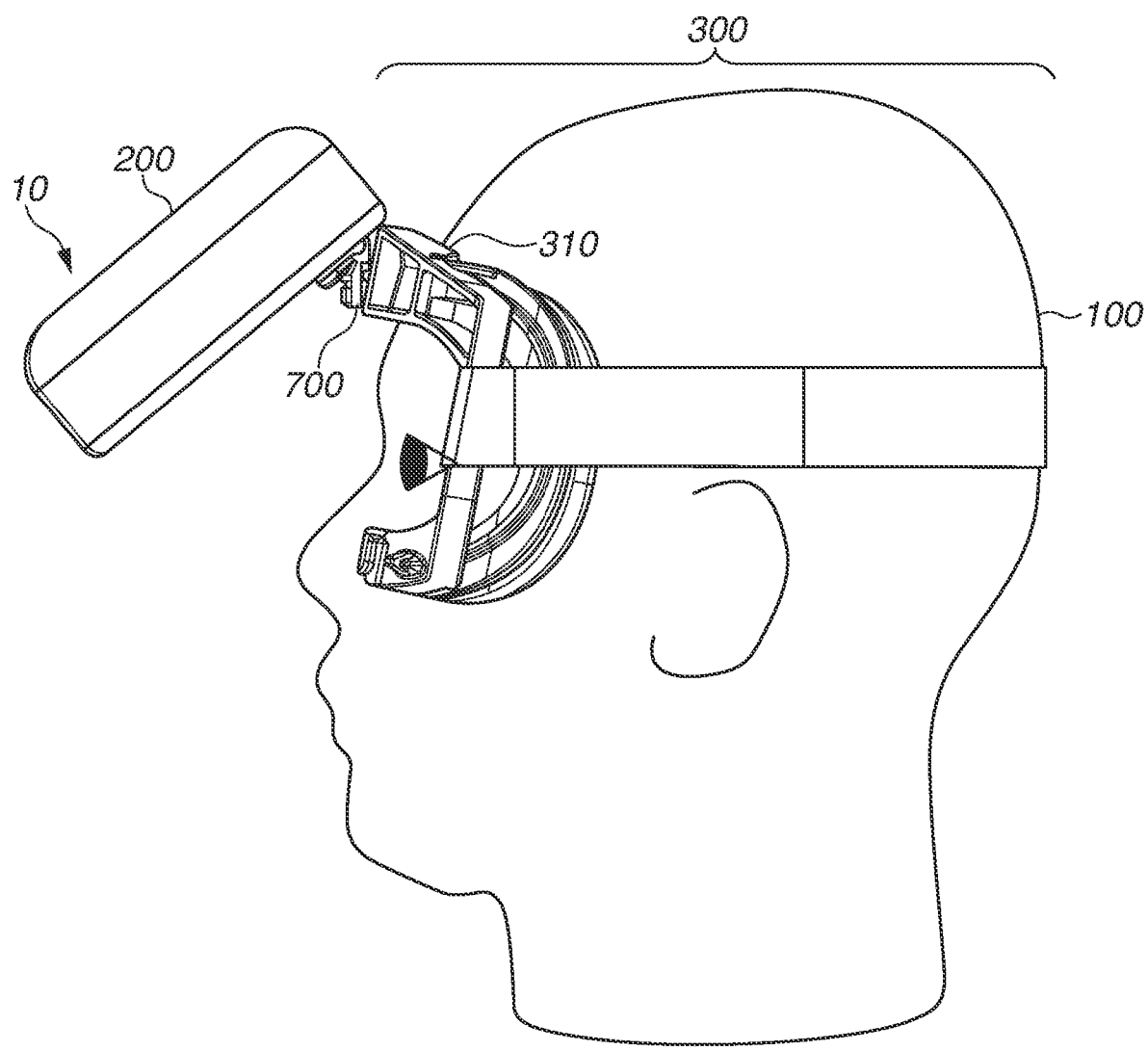
FIG. 8 is a diagram illustrating a tilt configuration according to the first exemplary embodiment.

As illustrated in FIG. 8, in a case where the image display unit 200 and the mount unit 300 are separate members, the mount unit 300 can support the image display unit 200, and can have a rotating portion 700 capable of rotating the image display unit 200 in a state where the mount unit 300 is mounted on the user head 100. For example, a torque hinge may be used for the rotating portion 700. In such a configuration, the image display unit 200 can tilt around the rotating portion 700 with respect to the mount unit 300, and can absorb individual differences occurring in the positions of the eyes of the user and the contact position of the user head 100 with respect to the abutment portion 310. In addition, when the user moves in a state of wearing the head mounted apparatus 10, the image display unit 200 is tilted to ensure the safety, so that a sufficient range in which a real space can be viewed can be ensured.

A second exemplary embodiment will be described next. As for a configuration similar to the first exemplary embodiment, the same symbol as that of the first exemplary embodiment is used, and description will be omitted.

Figure 9A:
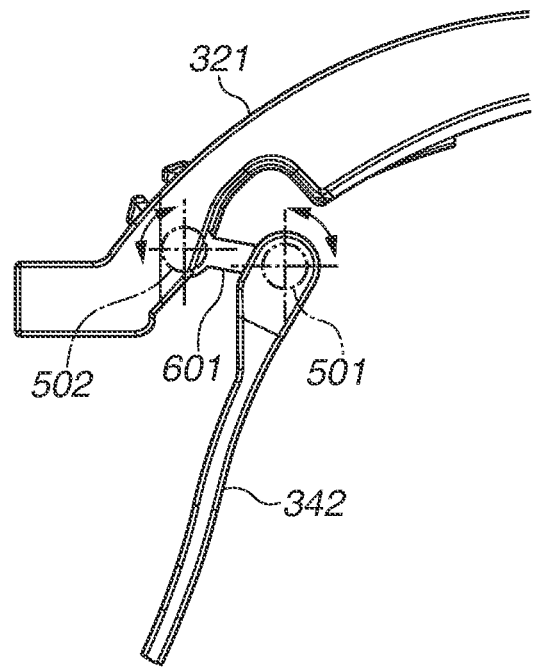
FIGS. 9A and 9B are diagrams illustrating a configuration according to a second exemplary embodiment.
Figure 9B:
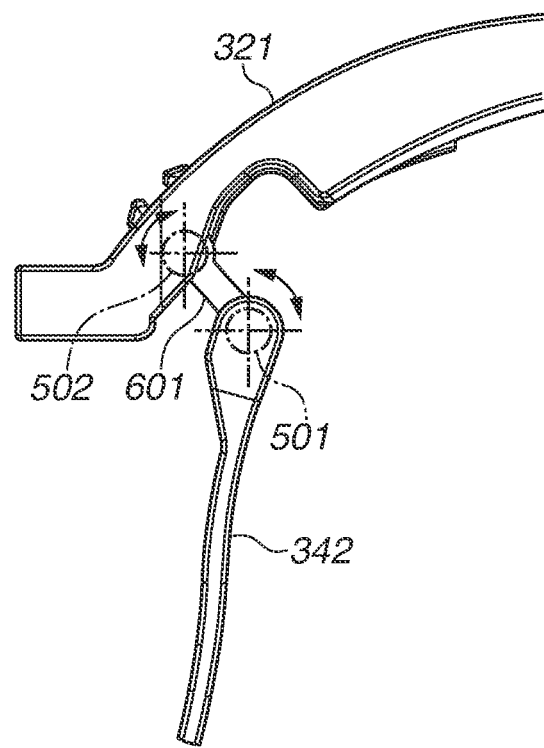

FIGS. 9A and 9B illustrate a connection relationship between a fixing-side member 321 and an assistance member 342 in the second exemplary embodiment. The assistance member 342 is connected to the fixing-side member 321 in a manner similar to that in the first exemplary embodiment, but the connection method thereof is different. The assistance member 342 is connected through a joint member 601 from the fixing-side member 321 via two or more hinges, so that the assistance member 342 can be moved with a higher degree of freedom as illustrated in FIGS. 9A and 9B. Having such a configuration further increases the movability range of the assistance member than the first exemplary embodiment, and can make an adjustment as desired by the user, so that an improvement in wearing comfort can be expected. In FIGS. 9A and 9B, support of the assistance member 342 is realized by using torque hinges 501 and 502.

A third exemplary embodiment will be described next. As for a configuration common to the first or second exemplary embodiment, the same symbol as that of the first or second exemplary embodiment is used, and description will be omitted.

Figure 10A:
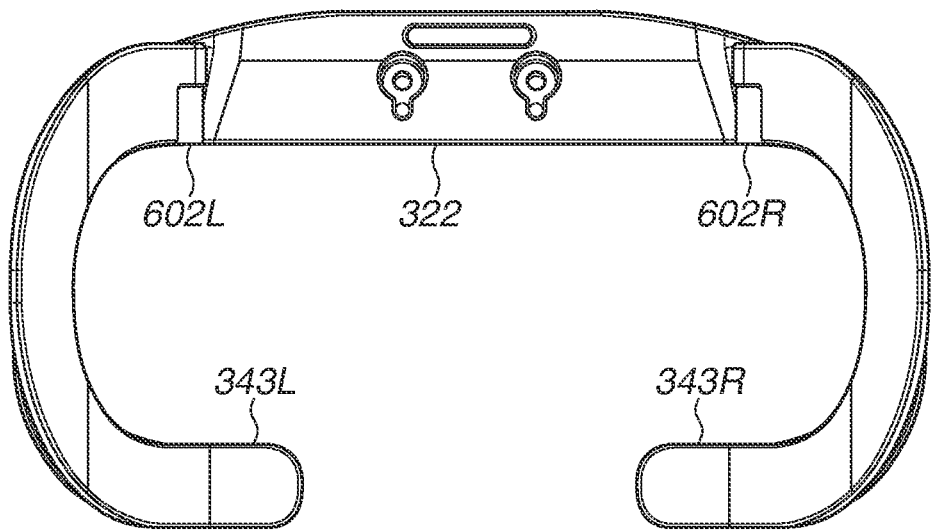
FIGS. 10A and 10B are diagrams illustrating a configuration according to a third exemplary embodiment.
Figure 10B:
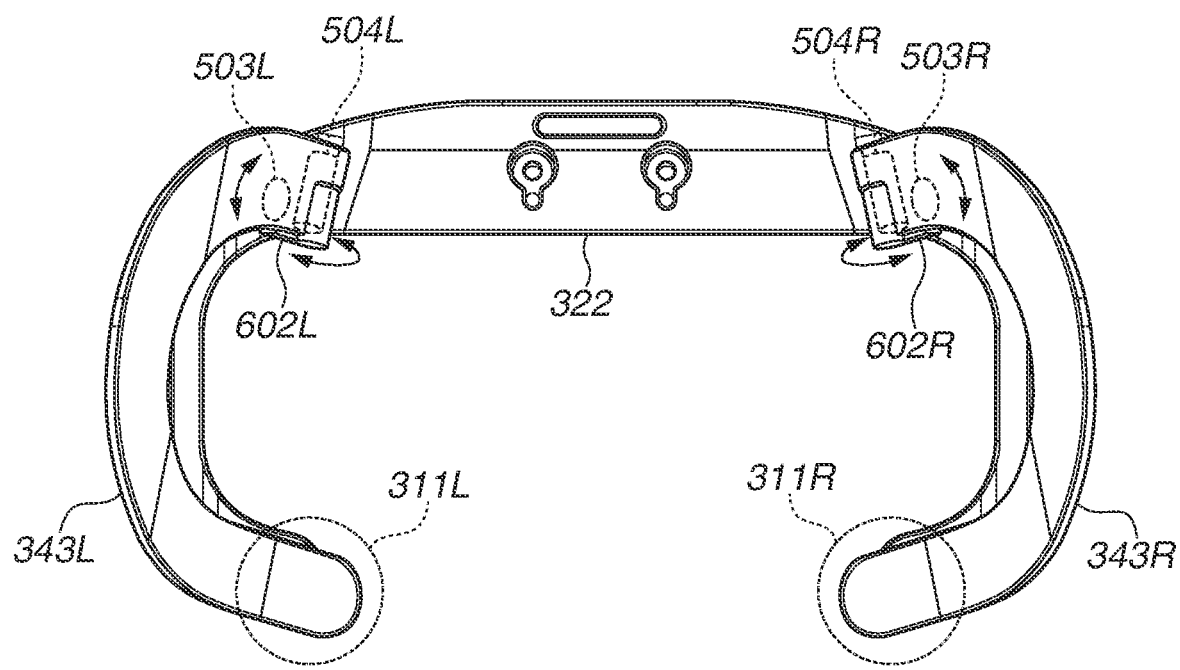

FIGS. 10A and 10B illustrate a connection relationship between a fixing-side member 322 and an assistance member 343 in the third exemplary embodiment. In these members, a member on the left side and a member on the right side are provided with a symbol with L and a symbol with R, respectively. The member on the left side and the member on the right side have the same functions and thus will be hereinafter collectively provided with a symbol formed only by numerals. The assistance member 343 is connected through a joint member 602 via two or more hinges similar to that in the second exemplary embodiment. In the present exemplary embodiment, of the hinges disposed above the assistance member 343, a rotation axis direction of one hinge is provided such that the assistance member 343 is rotated in a direction of opening outwardly as illustrated in FIG. 10B. Having such a configuration further increases the movability range of the assistance member, so that an improvement in wearing comfort can be expected.

In addition, in the present exemplary embodiment, an abutment portion 311 abutting the cheek of the user in the first exemplary embodiment, is held by the movable assistance member 343, instead of the fixing-side member 322. In such a configuration, a cheek abutment position can be moved, so that pressure concentration on the cheek can be eased, and an improvement in wearing comfort can be expected. In FIGS. 10A and 10B, support of the assistance member 343 is realized by using torque hinges 503 and 504. A lower part of the assistance member 343 is movably connected to the fixing-side member 322, so that the assistance member 343 can be prevented from bending when supporting the user head.

The exemplary embodiments of the present disclosure are described above, and can be combined and variously modified and altered within the scope of the gist of the present disclosure.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-192552, filed Oct. 11, 2018, which is hereby incorporated by reference herein in its entirety.

What is claimed is:

1. A head mounted apparatus to be mounted on the head of a user, the head mounted apparatus comprising:
    a display unit configured to display an image;
    an abutment structure portion disposed near the display unit and configured to abut the user's head;
    an elastic member connected to the abutment structure portion and configured to tighten about the user's head so as to hold a positional relationship between the abutment structure portion and the user's head;
    a pair of assistance structure members each of which is rotatably connected to the abutment structure portion by a hinge, and each of the pair of assistance structure members is configured to respectively rotate around a shaft of the hinge toward a right side portion and a left side portion of a face of the user and abut the right side portion and the left side portion so as to fit each of different shapes of various users' faces, and to assist holding by the elastic member; and
    an urging structure member configured to urge the pair of assistance structure members so as to stick the pair of assistance structure members respectively to the right side portion and the left side portion of the user's head.

2. The head mounted apparatus according to claim 1, further comprising a holding structure member configured to hold a positional relationship between the abutment structure portion and the pair of assistance structure members.

3. The head mounted apparatus according to claim 2, wherein the holding structure member includes at least one torque hinge.

4. The head mounted apparatus according to claim 3, wherein the holding structure member includes two torque hinges.

5. The head mounted apparatus according to claim 4, wherein one of the two torque hinges is configured to urge the pair of assistance structure members in a direction of opening outwardly.

6. The head mounted apparatus according to claim 1, further comprising a flexible structure member extending from the abutment structure portion to the pair of assistance structure members,
    wherein the flexible structure member is configured to be located between the abutment structure portion and the pair of assistance structure members, and the user's head.

7. The head mounted apparatus according to claim 6, wherein a fixing position of the flexible structure member is provided only on the abutment structure portion or only on the pair of assistance structure members.

8. The head mounted apparatus according to claim 6, wherein the flexible structure member has a shape for avoiding contact with a temple of a pair of glasses worn by the user.

9. The head mounted apparatus according to claim 1, wherein the pair of assistance structure members has a shape for avoiding contact with a temple of a pair of glasses worn by the user.

10. The head mounted apparatus according to claim 1, further comprising an imaging unit disposed near the display unit and having at least one imaging element and an imaging optical system,
   wherein the display unit is configured to display a real image captured by the imaging unit and to display a virtual space image, and
   wherein an opening portion is formed between the pair of assistance structure members and the display unit and allows the user to visually recognize a real space from periphery of the display unit.

11. The head mounted apparatus according to claim 1, further comprising a rotating structure configured to rotate the display unit with respect to the user's head.

12. The head mounted apparatus according to claim 11, wherein the rotating structure is configured to rotate the display unit in a tilt direction.

13. The head mounted apparatus according to claim 11, wherein the rotating structure is a torque hinge.

\* \* \* \* \*